Figure 1:
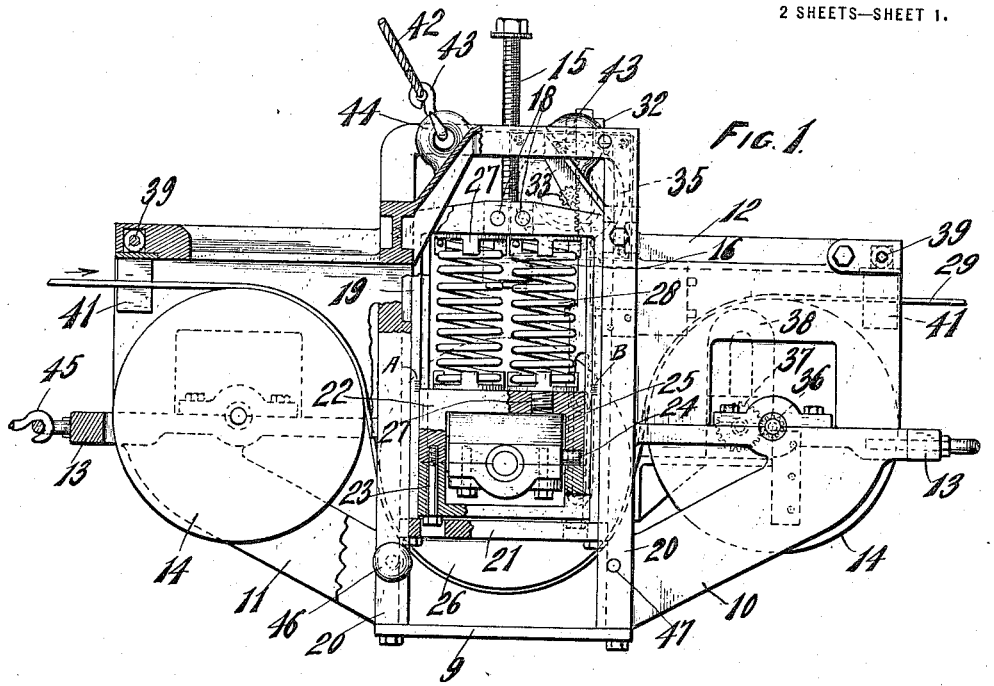

F. C. ZANZIG.
PORTABLE DYNAMOMETER.
APPLICATION FILED JAN. 2, 1914.

1,168,925.

Patented Jan. 18, 1916.
2 SHEETS—SHEET 1.

WITNESSES
Katherine Holt

INVENTOR
Frank C. Zanzig
By Morsell & Caldwell
ATTORNEYS

F. C. ZANZIG.
PORTABLE DYNAMOMETER.
APPLICATION FILED JAN. 2, 1914.
1,168,925.
Patented Jan. 18, 1916.
2 SHEETS—SHEET 2.
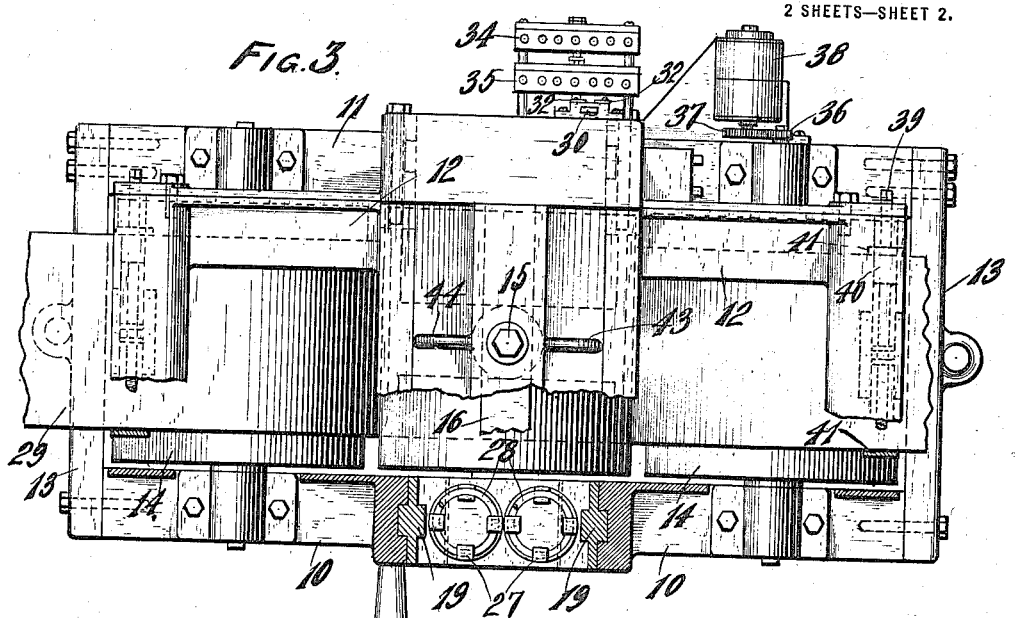
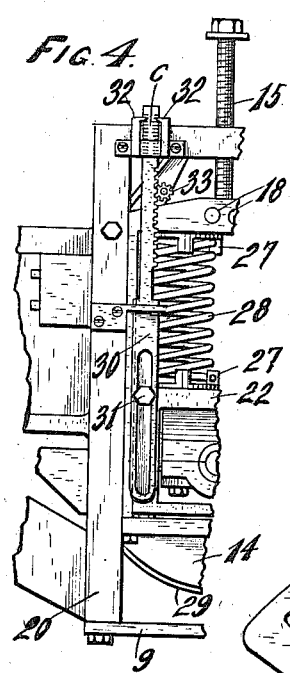
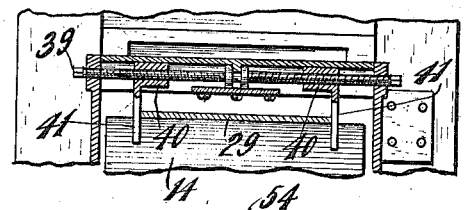
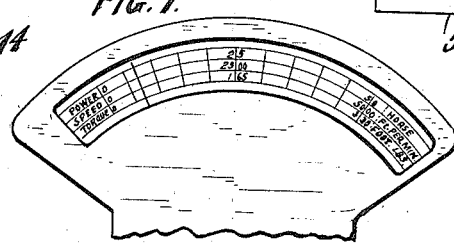
WITNESSES
INVENTOR
Frank C. Zanzig
By Morsell & Caldwell
ATTORNEYS

UNITED STATES PATENT OFFICE.

FRANK C. ZANZIG, OF MILWAUKEE, WISCONSIN.

PORTABLE DYNAMOMETER.

1,168,925.  Specification of Letters Patent.  Patented Jan. 18, 1916.

Application filed January 2, 1914. Serial No. 809,910.

*To all whom it may concern:*

Be it known that I, FRANK C. ZANZIG, a citizen of the United States, and resident of Milwaukee, county of Milwaukee, and State of Wisconsin, have invented new and useful Improvements in Portable Dynamometers, of which the following is a description, reference being had to the accompanying drawings, which are a part of this specification.

This invention has for its object to provide a suitable measuring instrument for determining power required to drive machines, the torque necessary to start or accelerate machines and the speed at which the machines are to be driven. The information is particularly valuable to one contemplating the buying of one or more power units for driving industrial machines, also for the purpose of determining the efficiency of operation in an industrial establishment, or for the purpose of determining the cost of power, especially when a motor or other power unit drives a line shaft from which several machines are driven and in which cases it is not always feasible or possible, when attempting to measure the input into the power unit, to shut down all of the machines when only one of them is under consideration. Ordinarily, the power required to drive a machine is estimated from the size of the pulley on the machine, or is obtained from the experience of the prospective buyer or from the experience of others, or is obtained from the manufacturer of the machine, in which case the power required is usually underrated. In any case, if for example it is contemplated to buy electric motors, it is advisable to provide a factor of safety, when definite or exact information is lacking, by providing a somewhat larger motor than required to do the work. This, however, leads not only to unnecessary cost of installation, but to an unnecessarily increased cost of operation, since a motor or other power unit of proper size will work with greater efficiency than an underloaded oversized motor. It is readily seen that, where a number of machines are to be driven by individual motors, power measurements taken before specifying the size of the motors have many advantages.

It is the object of the present invention to provide a measuring instrument to accomplish these results of determining the actual power required for driving the machines without the necessity for the use of present forms of large dynamometers weighing many hundreds of pounds and with special preparations for determining the power and torque. The torque measurements are necessary, as the torque required to start a machine determines the size of the motor in many cases where the starting torque greatly exceeds the running torque. In addition to the power measuring equipment a tachometer or speed counter is usually required for obtaining the speed at which the machine is to be operated under any given conditions. By the present method the accomplishment of these determinations, although accurate and complete, is open to the objection of being extremely costly, requiring the machine to be shut down for a relatively long time and requiring much adjustment and many trials before final tests can be made. Besides, the handling of many parts of a dynamometer, when placing it in position, or the handling of a bulky motor, temporarily used as a driving unit whose input is measured, limits the scope of present forms of power measuring devices.

The present invention relates to an instrument of such a size as to be readily portable and conveniently employed in the making of the said measurements without interrupting the operation of other machines and without a material delay in the operation of the machine being tested.

With the above and other objects in view the invention consists in the portable combination power and torque meter and tachometer as herein claimed and all equivalents.

Figure 2:
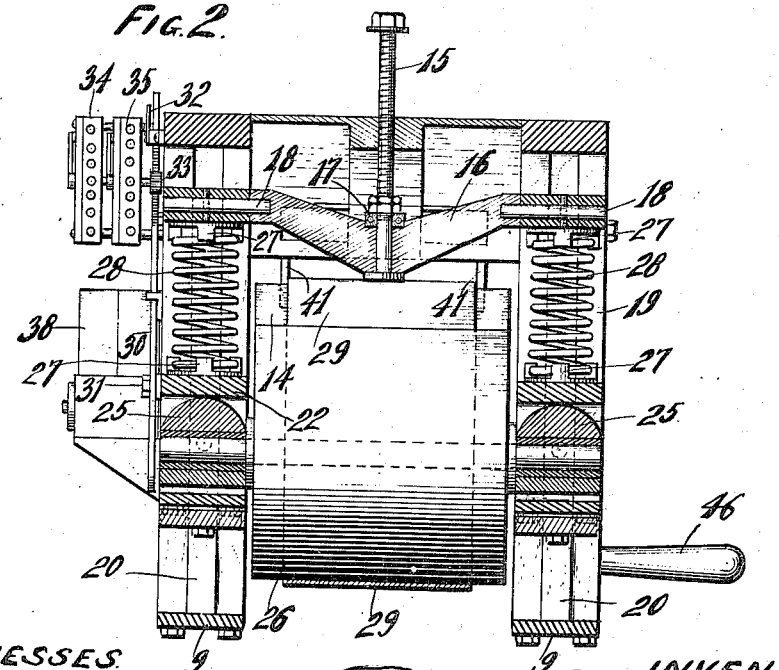

Referring to the accompanying drawings in which like characters of reference indicate the same parts in different views: Figure 1 is a side elevation, partly in section, of a portable measuring instrument constructed in accordance with this invention and applied to a belt as in use; Fig. 2 is a transverse sectional view thereof; Fig. 3 is a plan view thereof with parts broken away; Fig. 4 is a detail view showing the compression gage; Fig. 5 is a detail view of the adjustable belt guides; Fig. 6 is a diagram of electrical circuits; and, Fig. 7 is a view showing the volt meter scale.

In these drawings 10 and 11 indicate a pair of side frames which are connected together by a top frame 12 and end cross bars 13 to form a rigid casing. A pair of pulleys 14 are contained within this casing, being journaled in the side frames near their ends. The top frame 12 is arched at its central portion and has a compression screw 15 threaded therethrough which carries a yoke member 16 at its lower end, there preferably being a ball thrust bearing 17 between the compression screw and the yoke. The yoke 16 extends transversely across the casing and has its ends connected as by dowels 18 with a pair of inverted U-shaped spring frames 19 having external flanges or tongues fitting in guide grooves of a pair of vertical guide rails 20 formed in each of the side frames. The lower ends of each of the spring frames 19 are connected by removable plates 21 and internal guide flanges or tongues of the spring frames 19 have spring blocks 22 slidably fitting thereon, said spring blocks being of an inverted U shape and having U-shaped yoke plates 23 removably secured to them. Bearings are formed between the meeting edges of the spring blocks 22 and their removable yoke plates 23 to receive trunnions 24 of bearing members 25 in which a third pulley 26 is journaled, the bearing members 25 being rounded, as shown in Fig. 2, to permit them to rock on their trunnions 24. Spring seats 27 are removably secured to the under side of the top portion of the spring frames 19 and to the top of the spring blocks 22 and calibrated compression springs 28 are confined between these spring seats. The lower ends of each set of the guide rails 20 are connected by bottom plates 9 which are removably secured thereto by bolts. As thus far described, it will be understood that the dynamometer when applied to the driving belt of a machine to be tested by passing the belt, indicated by the numeral 29, over the pulleys 14 and beneath the pulley 26, the turning of the compression screw 15 causes the yoke 16 to force the spring frames 19 downwardly in the guideways of the side frames, carrying with them the pulley 26 which thereby serves as a belt tightener. Because of the ability of the spring blocks 22, which carry the pulley 26, to slide in the spring frame, due to the yielding of the springs 28, the pull on the belt when the machine is started or is in operation may be measured by the degree of such movement of the pulley 26 against the pressure of its springs 28. Thus, as the load on the machine increases with a corresponding increase in the driving torque, the pull on the driving belt increases and the pulley 26 is forced to a higher position in the frame, its spring yielding under the increased pull of the belt to permit thereof.

Any convenient means may be employed for measuring the increased pull of the belt by the increased compression of the springs and for this purpose I employ a gage rod 30 which is adjustably secured by means of a bolt 31 on the spring block 22 passing through a slot of the gage rod to enable the gage rod to be set at zero under the compression of the springs at the normal tension of the belt with the machine at rest and I also provide stationary gage fingers 32 on the side frame to indicate the compression of the springs upon the graduation marks forming Scale C formed on the upper end of the gage rod 30. Other sets of graduation marks forming Scales A and B may be formed on the spring frame 19 to indicate the degree of compression of the springs by the position of the top of the spring block with relation thereto and are employed in adjusting the initial tension of the belt to a number of pounds pull equal to approximately twenty-five times the number of inches in the width of the belt.

The gage rod 30 has rack teeth formed in one edge thereof to engage a pinion 33 on the shaft of a double rheostat 34 and 35 which is secured to one of the side frames, while a pinion 36 on the shaft of one of the pulleys 14 meshes with a gear wheel 37 of an electric generator 38 also mounted on one side of the side frames, said rheostat and generator being for a purpose which will be later described.

As the instrument is adapted for use with belts of different widths, adjustable belt guides are provided to keep the belt centrally upon the pulleys and a desirable form for such belt guides is shown in Fig. 5, wherein an adjusting screw 39 extends across the casing with square ends projecting through the side frames, such screw being held against longitudinal movement and having right and left hand screw threads formed thereon engaged by corresponding nuts 40 carrying the belt guiding fingers 41 so that the turning of the screws causes the belt guides to move farther apart or closer together to accommodate the belt between them and hold it centrally with relation to the pulleys.

Both driving and driven pulleys if not true may cause vibration of the belt and may tend to produce lateral vibrations in the dynamometer. To prevent this, one or more handles 46 are provided which may be threaded into openings 47 made for them in the side frames and by which the operator may steady the instrument. However, these handles are not intended to support the weight of the dynamometer which is done by the rope 42.

Suitable wiring connections are made between the generator 38 and rheostats 34 and 35, as shown in the diagram. A wire 50 connects one terminal of the resistance winding of rheostat 34 with the contact arm of rheostat 35 and a wire 51 connects the other terminal of rheostat 34 with one terminal of the generator 38, a volt meter 52 and a battery 53 which is preferably a single dry cell. A wire 54 connects one terminal of the resistance winding of rheostat 35 with the switch arm of a two point snap switch 55, one contact of which is connected by a wire 56 with the other terminal of the generator and the other contact is connected by a wire 57 including a variable resistance 58 with the other terminal of the battery 53. The volt meter 52 has its other terminal connected by a wire 59 to the switch arm of another two point snap switch 60, one contact of which is connected with the wire 54 while the other contact is connected by a wire 61 with the contact arm of rheostat 34. Rheostat 35 has the same number of contacts as rheostat 34, each step of resistance winding being four-tenths of an ohm as compared with sixteen-tenths of an ohm resistance of each step of resistance winding of rheostat 34. It is also preferable to use a ten watt, ten volt, one ampere generator to run at fifteen hundred revolutions per minute with its voltage proportional to its speed. It is also preferable to employ a portable ten volt, one thousand ohm volt meter which is calibrated to read directly in horse power and also to read directly the belt speed in feet per minute, as well as the toque in foot pounds, as shown in Fig. 7.

In operation the dynamometer of this invention is applied to the belt of the machine to be tested, if such belt has sufficient length to permit of its passing around the pulleys of the dynamometer; otherwise a substitute belt of proper length is temporarily provided. In order to pass the belt through the dynamometer it is only necessary to remove the belt from its pulleys so as to give it slack and then remove the side frame 10, when the belt may be readily placed in position on the pulleys of the dynamometer and the side frame is returned. In placing the belt around the pulleys of the dynamometer it is passed over the end pulleys 14 and beneath the center pulley 26, as shown. The dynamometer is then suspended from the ceiling or other overhead structure by a rope 42 having a hook 43 passing through one of the eyes 44 formed on the top frame 12, so that the weight is taken off from the belt. It is desirable to place the indicator always as far away as possible from the pulley toward which the belt is running and on the tight side of the belt, though it may be placed on the loose side if the volt meter is calibrated accordingly. To prevent the indicator from moving with the belt a hook 45 on a rope can be fastened to the end of the dynamometer or preferably one hook with two diverging ropes, thus preventing motion of the dynamometer laterally of the belt. The belt guides 41 are then adjusted to suit the width of the belt by means of the screws 39. The belt is now returned to the line shaft pulley and the pulley of the machine and is tightened by turning the compression screw 15 so as to force the pulley 26 downwardly.

When a six inch belt is used the pulley is to be screwed down until a reading of one hundred and fifty pounds is obtained on scale A, and for three inch belts seventy-five pounds on scale B, etc. The gage rod 30 is then set at zero and the bolt 31 tightened and after making electrical connections between the binding posts on the dynamometer and the indicating instrument, as shown in the diagram, conditions are ready for making the various tests obtainable by this instrument.

As previously stated there are two interchangeable sets of springs 28, one set capable of withstanding a maximum load of two hundred pounds, at which load it shall compress three-fourths of an inch, and the other capable of withstanding a maximum load of one hundred pounds at which load it shall compress the same distance, the compression in each being proportional to the load. The one hundred pound spring is to be used for three inch belts and narrower and the two hundred pound spring is to be used for widths of belt greater than three inches and up to six inches. To interchange these springs it is only necessary to remove the bottom plates 9 and the removable plates 21. The spring blocks 22 of the pulley 26 will now drop from position with the springs which may be unscrewed by hand and the other set put in their place and the parts again assembled. Scale A is to be used with the two hundred pound spring and scale B with the one hundred pound spring. As the increment of compression of the springs varies directly with the torque of the machine being tested, though not exactly proportional therewith, it is only necessary to measure the distance of movement of the spring blocks 22 from the position in which they stood upon giving the belt its initial tension and to calibrate this measurement to indicate the number of pounds of compression of the spring. Thus, the torque reading giving the effective pull in pounds when the two hundred pound spring is used may be obtained from the left hand side of scale C and from the right hand side of the same scale when the one hundred pound spring is used. The torque in foot pounds is obtained by dividing this reading by the radius of the pulley on the machine being tested and may be read without any corrections at any speed at which the machine is being run. Besides the torque reading from scale C, provision is made for a corrected torque reading from the volt meter 52, but for convenience the description thereof will follow the description of the speed and power reading.

The generator being such that its voltage is proportional to its speed it is only necessary to measure the voltage thereof and calibrate the volt meter scale to read speed in feet per minute as is done on the volt meter scale in Fig. 7 on the line marked "Speed". In order to obtain the connection for such reading both switches 55 and 60 are moved to positions in which they connect with wire 54. The volt meter is then placed directly across the terminals of the generator and indicates the full voltage thereof to be read as belt speed, the speed of the pulley of the machine being tested being determined therefrom in the usual manner by dividing the belt speed by 3.14 times the diameter of the pulley.

The power reading involving a measurement of both the speed and the torque is obtained by employing the principles of both of the two measurements as above described and is read directly from the volt meter. Thus, it is only necessary to turn the switch 55 so as to connect with wire 54 and to turn switch 60 to connect with wire 61 as shown in the diagram. This connects rheostat 34 with the generator and places the volt meter in position for indicating the drop in potential between one end of the resistance winding of rheostat 34 and the contact arm thereof in whatever position it may be placed due to the turning thereof by the engagement of the pinion 33 with the rack 30 and depending in its extent upon the degree of compression of the springs due to the torque of the machine being tested. As the reading of the volt meter in this connection will vary with the speed of the generator, as well as with the torque of the machine being tested, the volt meter scale may be calibrated to indicate the horse power directly and this is done on the scale at the line marked "Horse power".

The presence of the rheostat 35 is to introduce a corrective factor variable with the variation in the amount of the resistance winding of rheostat 34 which is bridged by the volt meter, such corrective resistance being introduced in the circuit in series with resistance winding of rheostat 34. This corrective factor may be omitted where extreme accuracy is not necessary.

The torque reading may be obtained from the volt meter by placing switch 60 in connection with wire 61 and switch 55 in connection with wire 57. This substitutes the battery 53 in the circuit in place of the generator and leaves the volt meter in connection as for measuring horse power. Now, the variable resistance 58 is adjusted so that when the contact arms of the rheostats are in their extreme position, as far as they can be placed from their starting position, the volt meter will show full deflection. Any intermediate position of the rheostat arms caused by the compression of the springs during the testing operation will produce a proportional reading of the volt meter with the correction incident to the introduction of the resistance from rheostat 35, as in the reading for horse power. With the volt meter scale calibrated to indicate the torque in foot pounds, as is done in the line marked "Torque" in Fig. 7, the torque of the machine being tested may be read directly from the volt meter. The object in providing the variable resistance 58 in the battery circuit is to compensate for the loss of voltage of the battery with age.

By means of this invention the testing apparatus for measuring power, speed and torque of a machine may be readily carried from place to place and may be quickly installed, usually upon the regular belt of the machine, and when so installed and anchored in position the desired information may be obtained at once by the proper manipulation of the switches and may be read directly from the volt meter.

It is obvious that the invention is not confined to the specific sizes and proportions of parts mentioned. It is not limited to use with belts of six inches width or less and though twenty-five pounds per inch of width of belt is stated as the approximate initial tension, this may be varied, as desired and may be as high as sixty pounds. Whatever initial tension per inch of width of belt is adopted must be used for all tests and the resistance coils of the correction rheostat must bear a definite ratio to the resistance of the main rheostat, though it is possible to eliminate the correction rheostat and yet obtain accurate readings by selecting a suitable initial belt tension, probably within the limits of forty to fifty pounds per inch of width.

While it is an object of the invention to provide a measuring instrument of the portable type, it is obvious that many of the novel features of construction are applicable to larger testing instruments which are not of the portable type.

What I claim as new and desire to secure by Letters Patent is:

1. A dynamometer, comprising a generator adapted to be driven with the machine being tested, a rheostat having an adjustable arm controlled by the torque of the machine being tested and having its resistance included in the circuit of the generator, and a volt meter spanning that portion of the resistance winding of the rheostat which is marked off by the adjustable arm thereof.

2. A dynamometer, comprising a speed meter consisting of a generator driven with the machine being tested and provided with a volt meter connected therewith, and a torque meter for connection between the machine being tested and the driving means therefor, said torque meter comprising a rheostat having an adjustable arm controlled by the torque of the machine being tested, said rheostat having connection with the generator and having the volt meter spanning the portion of the resistance winding set off by its adjustable arm.

3. A dynamometer, comprising a pair of pulleys adapted to have the belt of the machine being tested travel thereon, a spring actuated pulley having the portion of the belt between the other pulleys passing around it and yielding to the pull of the belt against the action of its spring, means consisting of a rheostat operated by the yielding movements of said pulley for indicating the degree of yielding movement of the last mentioned pulley to the pull of the belt when the machine being tested is driven, an electrical circuit including the resistance winding of the rheostat and a source of electrical supply, and a volt meter spanning the portion of the resistance winding of the rheostat traversed by the contact arm of the rheostat due to the operation thereof by the yielding movements of the pulley.

4. A dynamometer, comprising a pair of pulleys adapted to have the belt of the machine being tested travel thereon, a pulley having the portion of the belt between the other pulleys passing around it, means for causing said pulley to yield, with resistance to the pull of the belt, a generator driven by one of the pulleys, a rheostat having its contact arm controlled by the yielding movements of the yielding pulley and having its resistance winding included in the circuit of the generator, and a volt meter spanning the portion of the resistance winding of the rheostat traversed by the contact arm thereof.

5. A dynamometer, comprising a pair of pulleys adapted to have the belt of the machine being tested travel thereon, a third pulley having the portion of the belt between the other pulleys passing around it, means for causing said third pulley to yield, with resistance to the pull of the belt, a generator driven by one of the pulleys, a rheostat having its contact arm controlled by the yielding movements of the yielding pulley and having its resistance winding included in the circuit of the generator, a volt meter spanning the portion of the resistance winding of the rheostat traversed by the contact arm thereof to indicate the horse power of the machine being tested, a switch for connecting the volt meter across the terminals of the generator to indicate the speed of the belt, an independent constant potential circuit, and a switch for substituting the constant potential circuit for the generator when the first mentioned switch is in position to include the rheostat in the circuit for indicating on the volt meter the relative degree of movement of the contact arm of the rheostat to measure the torque of the machine being tested.

6. A dynamometer, comprising a pair of pulleys adapted to have the belt of the machine being tested travel thereon, a third pulley having the portion of the belt between the other pulleys passing around it, means for causing said third pulley to yield with resistance to the pull of the belt, a generator driven by one of the pulleys, a rheostat having its contact arm controlled by the yielding movement of the yielding pulley and having its resistance winding included in the circuit of the generator, a volt meter spanning the portion of the resistance winding of the rheostat traversed by the contact arm thereof to indicate the horse power of the machine being tested, a switch for connecting the volt meter across the terminals of the generator to indicate the speed of the belt, an independent constant potential circuit including a cell of battery and an adjustable resistance, and a switch for substituting the constant potential circuit for the generator when the first mentioned switch is in position to include the rheostat in the circuit for indicating on the volt meter the relative degree of movement of the contact arm of the rheostat to measure the torque of the machine being tested.

7. In a measuring instrument, a frame, a pair of pulleys journaled therein, spring frames slidably mounted in the frame, spring blocks slidably mounted in the spring frames, springs confined between the spring frames and the spring blocks, journal bearings carried by the spring blocks, a pulley journaled in the journal bearings, and means for adjustably sliding the spring frames in the frame.

8. In a measuring instrument, a frame, a pair of pulleys journaled therein, spring frames slidably mounted in the frame, spring blocks slidably mounted in the spring frames, springs confined between the spring frames and the spring blocks, journal bearings pivotally mounted in the spring frames, a pulley journaled in the journal bearings, and means for sliding the spring frames in the frame.

9. In a measuring instrument, a frame, a pair of pulleys journaled therein, said frame forming guideways between the pulleys, spring frames slidably mounted in the guideways, spring blocks slidably mounted in the spring frames, springs confined between the spring frames and the spring blocks, journal bearings pivotally mounted in the spring blocks, a third pulley journaled in the journal bearings between the other pulleys, a yoke connecting the two spring frames, and a jackscrew threaded through the frame and engaging the yoke for adjusting the position of the spring frames in the frame.

10. In a measuring instrument, a frame, a pair of pulleys journaled therein, said frame forming U-shaped guideways between the pulleys, removable plates connecting the ends of the spring frames, spring blocks slidably mounted in the spring frames, springs confined between the spring blocks and the spring frames, journal bearings pivotally mounted in the spring blocks, a third pulley journaled in the journal bearings, and means for sliding the spring frames in the frame.

11. In a measuring instrument, a frame, a pair of pulleys journaled therein, spring blocks slidably mounted in the frame, springs bearing on the spring blocks, a third pulley journaled in the spring blocks, a rack carried by one of the spring blocks, a pinion engaged by the rack, a rheostat adjusted by the turning of the pinion, and an electrical circuit including the rheostat for indicating the degree of movement of the spring blocks with relation to the frame.

12. In a dynamometer, a frame structure comprising side frames and a top frame, one of the side frames being detachable from the remainder of the frame, a pair of pulleys journaled within the side frames, a spring pressed pulley slidably mounted between the side frames and positioned between the pair of pulleys and adapted to have a belt pass beneath it while passing over the pair of pulleys, means for indicating the degree of sliding movement of the pulley, means for suspending the frame structure, and means for preventing the frame structure following the belt.

13. In a portable measuring instrument, a frame comprising side frames and a top frame, one of the side frames being detachable from the remainder of the frame, a pair of pulleys journaled within the side frames, a spring pressed pulley slidably mounted between the side frames and positioned between the pair of pulleys and adapted to have a belt pass beneath it while passing over the pair of pulleys, means for indicating the degree of sliding movement of the pulley, means for suspending the frame, means for preventing the frame following the belt, and an adjustable belt guide at each end of the frame.

In testimony whereof, I affix my signature, in presence of two witnesses.

FRANK C. ZANZIG.

Witnesses:
R. S. C. CALDWELL,
KATHERINE HOLT.